T. W. McDILL.

Cultivators.

No. 6,137.

Reissued Nov. 17, 1874.

Witnesses.
P. Hennay
D. G. Stuart

Inventor:
Thomas W. McDill
by W. B. Richards & A. McCallum
Attys

N. PETERS, PHOTO-LITHOGRAPHER, WASHINGTON, D. C.

UNITED STATES PATENT OFFICE.

THOMAS W. McDILL, OF BATAVIA, ASSIGNOR OF ONE-HALF HIS RIGHT TO J. C. McDILL, OF MONROE, IOWA.

IMPROVEMENT IN CULTIVATORS.

Specification forming part of Letters Patent No. 29,707, dated August 21, 1860; extended seven years; reissue No. 6,137, dated November 17, 1874; application filed October 2, 1874.

*To all whom it may concern:*

Be it known that I, THOMAS W. McDILL, of Batavia, in the county of Jefferson, State of Iowa, have invented certain Improvements in Cultivators, of which the following is a specification:

My invention relates to improvements in that class of agricultural implements commonly known as walking straddle-row cultivators—machines which are used for cultivating both sides of a row of corn or other growing crop simultaneously.

The invention consists in certain improvements in the construction and operation of the machine, all as hereinafter fully set forth.

Figure 1:
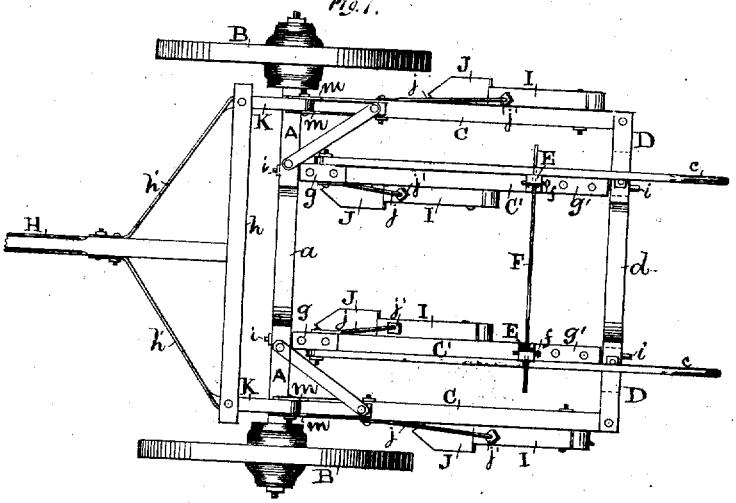
Figure 2:
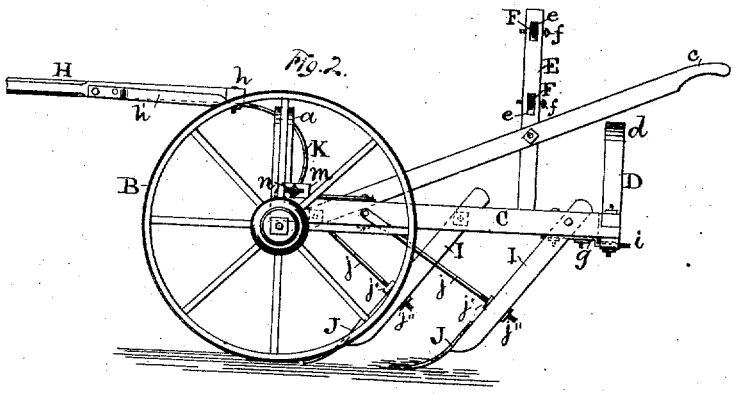
Figure 3:
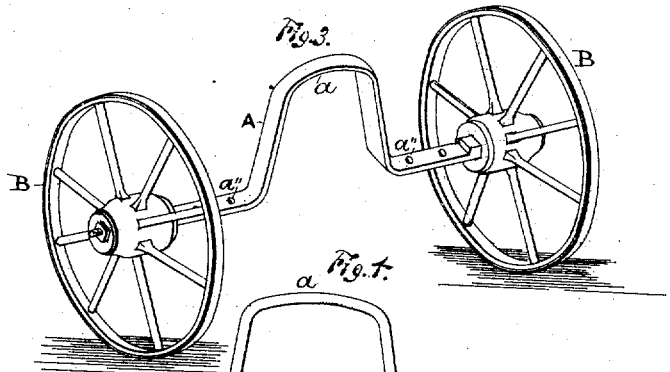
Figure 4:
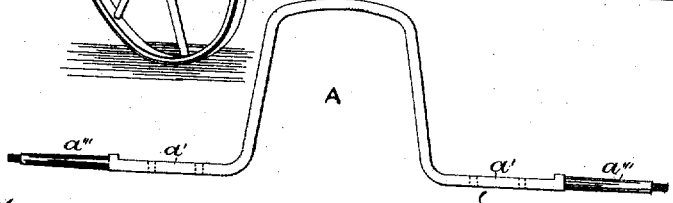

In the accompanying drawings, Figure 1 is a plan view of my improved cultivator. Fig. 2 is a side elevation of the same. Fig. 3 is a perspective view, showing the axle and wheels. Fig. 4 is a front elevation of the axle.

Referring to the parts by letters, A represents the axle. The central portion is elevated, as shown at *a*, so as to permit the growing plants to pass under it without injury. The sides are turned downward in a vertical direction, and then outward horizontally, as shown at *a'*, so that the plow-beams may be connected directly thereto at a suitable height from the ground and at proper distances apart, bolt-holes *a''* being provided for that purpose. The ends or extremities are formed into spindles *a'''* for the wheels B B. I have shown this axle as made of metal, in one piece; but it may be made partly of wood and partly of metal, as found most convenient. C C and C' C' are the plow-beams. They are attached to the horizontal portions *a'* of the axle at their front end, and connected at their rear end by a cross-bar, D, the central portion of which is elevated like the axle, as shown at *d*. The inner beams C' C' are provided with handles *c*, and also with standards or uprights E, having slots *e*. These standards are connected by cross-bars F, which are passed through the slots *e* and secured by bolts or pins *f*, the slots being sufficiently large to permit of a lateral movement of the beams. The beams C' C' are also provided with plates or clevis *g g'* at their ends, and pivot bolts or spindles *i*, connected with the clevis, are passed through the axle and rear connecting-bar D. This mode of connecting the beams C' C' to the axle admits of their having a lateral and turning movement, and all the plow-beams, with their plows, may be raised above the ground by the handles when desired. I represents the plow-standards, having cultivator-shovels J, of usual or any of the well-known forms. *j* are brace-rods, secured at one end to the plow-beams. The other end is screw-threaded and passed through the shovel-standard I, a nut, *j'*, being placed on the front side, and a nut, *j''*, on the rear side of the standard. This mode of attaching the shovel-standards to the plow-beams permits of the adjustment of the angle of the shovel with relation to the soil, so as to run deep or shallow, as desired, the adjustment being accomplished by screwing or unscrewing the nuts *j' j''*. The upper ends of the standards and brace rods are bolted to the beams, so as to permit of this adjustment. H is the draft-pole, having a rear cross-bar, *h*, and brace-rods *h'*, which connect the extremities of the cross-bar with the tongue, as clearly shown in Fig. 1 of the drawing. The tongue is elevated like the central portion of the axle, and is connected with beams C C by means of curved arms K, the upper ends of which are secured to the extremities of the cross-bar *h* of the tongue, and their lower ends are passed between plates *m*, which have elongated slots, through which, and through the lower ends of the arm K, bolts *n* are passed.

This mode of attaching the draft-pole to the plow-beams permits of the latter being not only freely raised and lowered by the handles, but of being turned bodily upward and made to rest on the draft-pole, so that the machine may be conveniently transported from place to place when not used in the cultivation of the crops. The beams C C' may be readily removed from the machine when not desired for use.

From the above description it will be seen that, as the machine is drawn along, the beams C' C', with their shovels or plows, may be moved laterally either to the right or left, and in case of their meeting with obstructions they may be readily deflected or turned so as to pass over the obstructions; or all the plows may be elevated to clear obstacles in their path, and when not desired for use they may be suspended above the ground by turning the beams bodily over, so as to rest on the tongue.

It will also be observed that with the peculiarly-formed axle which I have shown and described, the plow-beams may be attached directly thereto at a proper and convenient height above the ground, and that the central portion is elevated so as to pass over the crop being cultivated without injury.

What I claim as my invention, and desire to secure by Letters Patent, is—

1. The axle A of a walking straddle-row cultivator, constructed substantially as described, with an elevated central portion, *a*, horizontal portions *a'*, for attachment of the forward ends of the beams, and with spindles *a'''* for the wheels, substantially as set forth.

2. The combination of the axle A with the beams C C', the latter attached to the horizontal portions *a* of the axle, substantially as and for the purpose specified.

3. The beams C' C', pivoted to the axle A and cross-bar D by spindles *i*, substantially as and for the purposes specified.

4. The combination of the beams C C and C' C', axle A, and bar D with the tongue H and bent arms K, substantially as and for the purpose specified.

In testimony whereof I have hereunto set my hand to this specification.

THOMAS W. McDILL.

Witnesses:

CASPUR DURR,
M. S. FRISBE.